Patented Oct. 24, 1944

2,360,864

UNITED STATES PATENT OFFICE 2,360,864

SYNTHETIC RUBBER COMPOSITION

Charles F. Fryling, Silver Lake, Ohio, assignor to The B. F. Goodrich Company, New York, N. Y., a corporation of New York No Drawing. Application May 2, 1941, Serial No. 391,515

4 Claims. (Cl. 260—36)

This invention relates to new compositions of matter possessing excellent plasticity and tackiness which are obtained by incorporating certain alkyl substituted phenols in synthetic rubber of the type prepared by the polymerization of a conjugated diene hydrocarbon or of a mixture of materials consisting predominantly of a conjugated diene hydrocarbon.

The processing of synthetic rubber has in general presented many problems not encountered in the processing of natural rubber because of different behavior on roll mills, differences in plasticity and tackiness, incompatibility of synthetic rubber with certain softening materials commonly employed in natural rubber and other differences in properties. One of the most serious of these problems is the production of synthetic rubber compositions possessing both softness and tackiness to the same extent as is easily obtained in natural rubber compositions. Without these properties it is difficult to use synthetic rubber compositions in manufacturing processes which require such steps as calendering, extruding, or the plying up of successive layers of the material. Although certain materials which soften synthetic rubber are known, compositions containing such softeners do not possess satisfactory tack unless a tackifying solution is applied to the surface of the composition, and even this treatment does not produce satisfactory tack with compositions employing some of the known softeners.

It is an object of this invention to provide a class of materials which will produce both softness and tackiness when incorporated in synthetic rubber. A further object of the invention is to provide materials which may be added to dispersions of synthetic rubber to increase the plasticity and tackiness of the crude rubber-like material obtained by coagulating such dispersions. Other objects will appear from the following description of the invention.

I have discovered that the above and other objects may be accomplished by the incorporation with synthetic rubber of an alkyl substituted phenol having at least one alkyl side chain containing more than one carbon atom. Among such phenols there may be mentioned the mono-alkyl substituted mono-hydric phenols such as o, m or p-ethyl, n-propyl, isopropyl, n-butyl, sec-butyl, tert-butyl, n-amyl, tert-amyl phenol or the like; the di-, tri- or poly-alkyl substituted mono-hydric phenols such as di-ethyl phenol, di-propyl phenol, di-butyl phenol, di-amyl phenol, 3-methyl 6-isopropyl phenol (thymol), 2-methyl 5-isopropyl phenol (carvacrol), di-ethyl o-cresol, di-propyl p-cresol, di-butyl m-cresol, di-ethyl xylenol, di-butyl xylenol or the like; the mono-alkyl substituted di-, tri- or poly-hydric phenols such as ethyl, n-propyl, isopropyl, n-butyl, tert-butyl, n-amyl or tert-amyl substituted catechol, resorcinol or pyrogallol or the like; the di-, tri- or poly-alkyl substituted di-, tri- or poly-hydric phenols such as di-ethyl, di-propyl, di-n-butyl, di-tert-butyl, di-tert-amyl, or methyl ethyl substituted catechol, resorcinol, pyrogallol, phloroglucinol or the like and similarly substituted compounds of the naphthalene, anthracene, phenanthrene or other aromatic series. In all these compounds it is to be noted that at least one hydroxy group is attached to a carbon atom occurring in an aromatic ring, thereby making the compound a phenol, and at least one alkyl group containing more than one carbon atom is likewise attached to a ring carbon, thereby placing the compound in the class herein designated as alkyl substituted phenols having at least one alkyl side chain containing more than one carbon atom.

Although these compounds impart both softness and tackiness to synthetic rubber, this same ability is not present when simple phenols or methyl substituted phenols are employed. The reason for this is not known with certainty but it may be related to the decreased solubility of these higher alkyl derivatives in the synthetic rubber. These higher alkyl substituted phenols possess another important advantage over simple phenols when used in synthetic rubber in that they are less toxic, less corrosive, and do not possess the undesirable odor of simple phenols.

The higher alkyl substituted phenols hereinabove described may be employed as tackifying softeners for synthetic rubber of the type prepared by the polymerization of a material consisting predominantly of a conjugated diene hydrocarbon. Thus, the synthetic rubber may be prepared by the polymerization of a conjugated diene hydrocarbon such as butadiene, isoprene, di-methyl butadiene, piperylene or the like either alone or in admixture with one another or with other unsaturated compounds polymerizable with a conjugated diene to yield rubber-like copolymers. As examples of unsaturated compounds polymerizable with conjugated dienes there may be mentioned aryl olefinic hydrocarbons such as styrene, vinyl naphthylene and their chloro or alkoxy substituted derivatives; alpha-beta unsaturated carboxylic acids and their esters, nitriles, amides and the like such as acrylic acid, methacrylic acid, methyl acrylate, methyl methacrylate, ethyl methacrylate, butyl acrylate, acrylonitrile, methacrylonitrile, ethacrylonitrile, acryl amide and the like; and other unsaturated monomers including vinylidene chloride, isobutylene, methyl vinyl ether, methyl vinyl ketone, vinyl ethinyl alkyl carbinols, vinyl acetylene and other unsaturated hydrocarbons, esters, ketones, alcohols, acids and ethers. All these unsaturated compounds polymerizable with conjugated dienes will, in general, contain the polymerizable group.

When a mixture of the conjugated diene and one or more of these unsaturated compounds is polymerized it is usually necessary to employ more of the diene than of the other compound in order to obtain a rubbery material. The polymerization to form the synthetic rubber may be effected by any of the methods well known to the art such as homogeneous polymerization, polymerization in aqueous emulsion, etc.

The incorporation of the alkyl substituted phenol with the synthetic rubber may be carried out by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent. Each of these methods has its own peculiar advantages as will be be seen hereinafter.

In one embodiment of the invention where the alkyl substituted phenol is incorporated with the rubber during the milling operation, a batch consisting of 100 parts by weight of a synthetic rubber prepared by copolymerizing in aqueous emulsion 55 parts of butadiene and 45 parts of acrylonitrile was broken down on a roll mill at 120–130° F. 50 parts of di-butyl meta cresol were then added in 34 minutes while continuing the milling of the synthetic rubber. The milling behavior of the rubber containing this softener was greatly improved over the behavior of the same rubber with conventional softeners. The conventional pigments (zinc oxide, channel black and stearic acid), sulfur, age resistor and accelerator were then added and dispersed well in the softened composition. The composition so prepared possessed excellent tackiness as evidenced by sticking two pieces of the composition together. When many other known softeners are employed in a similar fashion, the composition does not possess this tackiness unless treated with a tackifying solution. When the composition containing dibutyl meta cresol was cured, a vulcanizate having good tensile strength and elongation was produced.

In another embodiment of the invention, a synthetic rubber latex was prepared by polymerizing a mixture of butadiene and acrylonitrile in aqueous emulsion. 5 parts by weight of p-tertiary butyl catechol were then added to 100 parts of the latex and the latex was coagulated, after the addition of 3 parts of phenyl beta naphthyl amine, by a mixture of alcohol and salt. The coagulated rubber was plastic and tacky and exhibited no hardening when milled. A similar experiment using the same latex but without the addition of the p-tert-butyl catechol product a rubber which was non-tacky, of inferior plasticity and hardened appreciably when milled. The crude rubber obtained in the first experiment was also more stable to the action of oxidizing agents and aging than was the rubber obtained in the latter experiment, thus showing that the phenol also had a stabilizing effect on the latex.

Other embodiments of the invention show that the use of alkyl substituted phenols in other synthetic rubber compositions produces the same softness and tackiness as is shown in the above embodiments. Accordingly this invention is of widespread usage in the compounding and processing of synthetic rubber since in practically all the uses to which synthetic rubber may be put it is desirable that the rubber during processing be soft and plastic and tacky.

The compounding of the compositions containing synthetic rubber and the alkyl substituted phenol may, of course, be varied widely to suit the particular application. Any of the compounding ingredients ordinarily used for natural or synthetic rubber such as pigments, fillers, vulcanizing agents, age resistors and other softeners as well as natural rubber or other resinous material may be employed as desired in the compositions herein described. Processing, handling, and using the compositions of this invention, whether they be unvulcanized compositions, vulcanized compositions, latex-like dispersions, or cements may be effected in substantially the same manner as is commonly employed with similar materials containing natural rubber.

It is apparent that many widely different embodiments of the invention may be made without departing from the spirit and scope thereof, and therefore it is not intended to be limited except as indicated in the appended claims.

I claim:
1. A rubbery composition of improved tackiness comprising a rubbery butadiene-1,3 acrylonitrile copolymer and, as a tack-imparting softener therefor, an alkyl substituted phenol having at least one alkyl side chain containing more than one but less than six carbon atoms.
2. The composition of claim 1 wherein the tack-imparting softener is p-tertiary butyl catechol.
3. The composition of claim 1 wherein the tack-imparting softener is dibutyl meta cresol.
4. A vulcanized synthetic rubber composition obtained by vulcanizing a rubbery composition comprising a rubbery copolymer of butadiene-1,3 and acrylonitrile and, as a tack-imparting softener therefor, an alkyl substituted phenol having at least one alkyl side chain containing more than one but less than six carbon atoms.

CHARLES F. FRYLING.

CERTIFICATE OF CORRECTION.

Patent No. 2,360,864. October 24, 1944.

CHARLES F. FRYLING.

It is hereby certified that error appears in the printed specification of the above numbered patent requiring correction as follows: Page 2, first column, line 9, after the word "group" strike out the period and insert instead a comma; and second column, line 7, for "product" read --produced--; and that the said Letters Patent should be read with this correction therein that the same may conform to the record of the case in the Patent Office.

Signed and sealed this 27th day of March, A. D. 1945.

Leslie Frazer (Seal) Acting Commissioner of Patents.